Nov. 24, 1953  J. G. THOMAS  2,660,141
WELDING VISE

Filed Feb. 23, 1950  2 Sheets-Sheet 1

INVENTOR.
JAMES G. THOMAS
BY Richey & Watts
ATTORNEYS

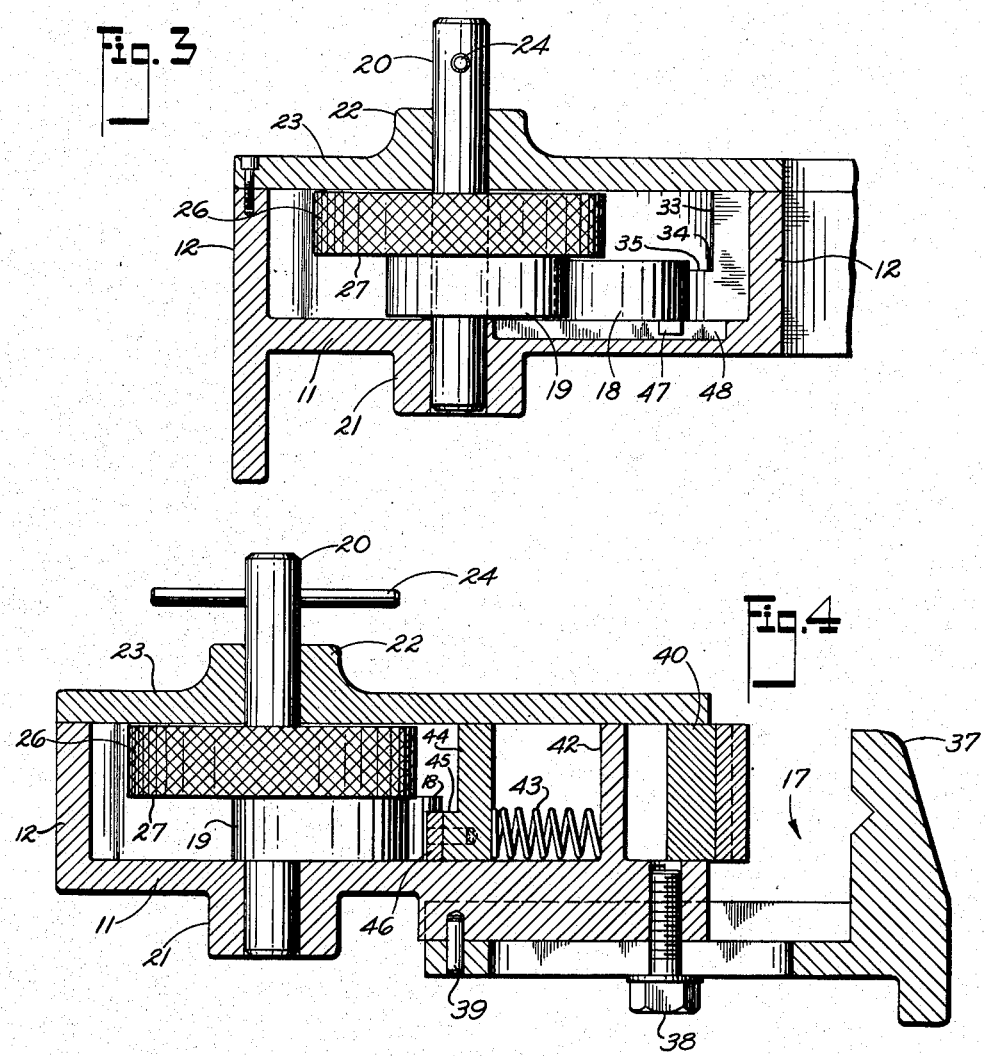

Patented Nov. 24, 1953

2,660,141

UNITED STATES PATENT OFFICE 2,660,141

WELDING VISE

James G. Thomas, Cleveland, Ohio

Application February 23, 1950, Serial No. 145,720

3 Claims. (Cl. 113—99)

This invention relates to article holding clamps and, more particularly, to welding fixtures.

An object of the invention is the provision of a welding fixture adapted for holding work pieces of various sizes.

Another object of the invention is the provision of a welding fixture adapted for holding work pieces of various shapes.

Another object of the invention is the provision of a hand operated fixture which will hold work pieces securely in place.

A further object of the invention is the provision of a fixture which may be rapidly and easily operated.

A still further object of the invention is the reduction of costs incident to the maintenance in stock of a wide variety of sizes of welding fixtures.

The fixture of the invention incorporates two vices for holding work pieces securely in angularly positioned relationship. The movable jaws of the vices are hand operated by a novel arrangement including a follower cam simultaneously engaging a driver cam and inclined inner faces of the movable jaws. Stated generally, the follower cam is constrained to move substantially linearly while freely rotatable to accommodate unequal displacements of the movable jaws. It is a particularly advantageous feature of the device that high force magnification ratios may be obtained while permitting rapid and easy operation.

Figure 1:
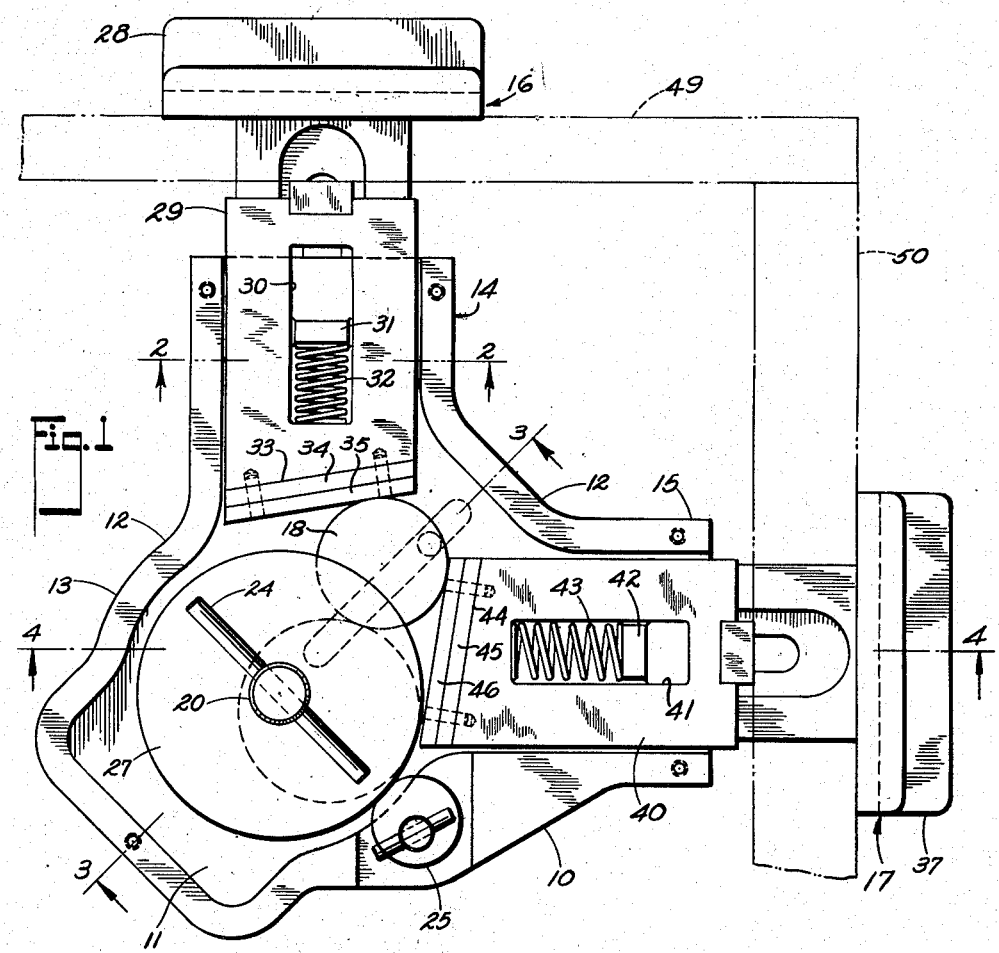
Figure 2:
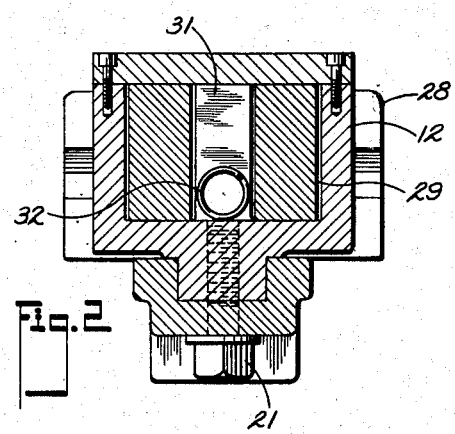

These and other objects, features, and aspects of the invention will be more readily apparent from a consideration of the following detailed description of a specific embodiment thereof, taken with the annexed drawings, in which: Fig. 1 is a plan view, with cover removed, of a fixture embodying the invention; Fig. 2 is a vertical sectional view taken along the line 2—2 of Fig. 1; Fig. 3 is a vertical sectional view taken along the line 3—3 of Fig. 1; and Fig. 4 is a vertical sectional view taken along the line 4—4 of Fig. 1.

Referring now to the figures, the fixture illustrated therein comprises a body member or frame 10 having a base 11 and vertical wall portions 12. The body member is formed with a central portion 13, and two extended arm portions 14 and 15 serve as determinants for two vices 16 and 17, respectively. The central portion 13 provides support for the vice actuating mechanism which includes a follower cam 18 and a driver cam 19. The driver cam 19 is mounted upon a drive shaft 20 which is supported by a lower bearing 21 incorporated in the base 11 and an upper bearing 22 incorporated in a cover 23. The device is completed by a handle 24 and a clamping mechanism including a locking cam 25 which engages a knurled face 26 of a brake wheel 27 mounted upon the shaft 20.

The vise 16 includes a (fixed) jaw 28 which is fastened to the arm portion 14 by a stud 21 and preferably positioned by a dowel. A movable jaw 29 is slidably mounted within the arm portion 14 and is formed with an opening 30 to accommodate a projection 31 and a retractor spring 32. The inner face 33 of the movable jaw is inclined with respect to the direction of motion of the jaw and incorporates an extended ledge 34 which in turn supports a hardened bearing plate 35.

The vise 17 is supported by the arm portion 15 and arranged in the same manner as the vise 16. A fixed jaw 37 is fastened by a stud 38 and positioned by a dowel 39 while a movable jaw 40 has an opening 41 to accommodate a projection 42 and a retractor spring 43. An inner face 44 of the movable jaw 40 is inclined with respect to the direction of motion of the jaw and also incorporates a ledge 45 and a bearing plate 46. The inclined inner faces 33 and 44 of the movable jaws 29 and 40 may preferably form equal angles with respect to a line of symmetry between the arm portions 14 and 15, although such an arrangement is not essential to the practice of the invention.

The follower cam 18 of the vice actuating mechanism comprises a body portion formed by a cylindrical section of hardened material and a pin 47 fitted into the cam body at a point adjacent to the outer edge. A groove 48 in the base 11 acts as a receiver for the pin 47 so that the cam is constrained to move along the line of the groove while being free to rotate. The follower cam is thus free to assume any position for the simultaneous engagement of the driver cam 19 and the bearing plates 35 and 46 of the movable jaws, whatever the position of those elements. The bearing surfaces of the base 11, the driver cam 19, the follower cam 18, and the bearing plates 35 and 46 must, of course, be such as to minimize the friction between those parts.

The vice actuating mechanism serves to transform rotational motion of the handle 24 into translational motion of the movable jaws 29 and 40. As the driver cam 19 rotates, the follower cam 18 tends to slide along the groove 48 and exert substantially equal forces upon the bearing plates 35 and 46 of the movable jaws. However, if one of the movable jaws engages a work piece before the other, as is shown in Fig. 1, the follower cam will assume a position such that the motion is primarily rotational about a point where the pin 47 bears upon a side wall of the groove 48. The turning force of the drive cam is thus transmitted to the more extended movable jaw while a force is maintained upon the remaining movable jaw. Due to this action, it will be seen that the device is particularly adapted for handling work pieces of unequal size.

In operation, the work pieces, such as, for example, the bar stock 49 and 50, is placed in the vices. The handle is then turned and the work pieces may be securely positioned by the forces exerted by hand. The pieces are then clamped in place by operation of the locking cam 25. It is an advantageous feature of the invention that work pieces of a great variety of sizes may be accommodated by adjustment of the fixed jaws 28 and 37. Further, jaws suitable for handling work pieces of special shapes, as for example, angle or channel strip, may be readily utilized with the basic clamping mechanism.

It is to be understood that specific terminology of the foregoing description of the embodiment of the invention is not intended to be restrictive or confining, and that various rearrangements and modifications of the parts may be resorted to without departing from the scope or spirit of the invention as herein claimed.

What is claimed is:

1. In a welding fixture, the combination of a body member, two angularly related fixed jaws attached to said body member, spring retractable jaws mounted in said body and complementing said first named jaws to form vises, each of said retractable jaws having a bearing surface at the inner end thereof forming an acute angle with respect to a line of symmetry between said jaws, a substantially circular sliding cam engaging the bearing surfaces of said retractable jaws, and an axially rotatable driver cam engaging said sliding cam a groove in the body member and a pin projecting from the sliding cam and into the groove for confining the movement of the sliding cam whereby rotation of the driver cam will produce sliding motion of each jaw whatever the position of the remaining jaw.

2. A clamp comprising a body member including spaced top and bottom walls, a first pair of spaced side walls, a second pair of spaced side walls and angularly spaced from the said first pair, a jaw member disposed between each of the pairs of side walls and constrained to slide into and out of the body member, a jaw member affixed to the body member and positioned adjacent the outer end of each sliding jaw member for cooperating with that member, and means for actuating the sliding jaw members comprising a handle outside the body member carried by a shaft extending into the interior of the body member, and a driver cam on the shaft, and a substantially circular follower disposed between and engaged with the inner ends of the sliding jaw members and with the driver cam, a groove in the body member and a pin projecting from the follower and received in the said groove for positioning the follower for engagement with the sliding jaw members.

3. A clamp for holding work pieces in fixed angular relationship comprising a body member including spaced top and bottom walls, a first pair of spaced side walls, a second pair of spaced side walls angularly spaced from the first pair, a jaw member disposed between each of the pairs of side walls and constrained to slide into and out of the body member, a jaw member affixed to the body member and positioned adjacent the outer end of each sliding jaw member for cooperating with that member, and means for actuating the sliding jaw members comprising a handle outside the body member carried on a shaft extending through the top and bottom walls, and a driver cam on the shaft, and a follower disposed between and engaged with the inner ends of the sliding jaw members and with the driver cam, a groove extending along a line of symmetry between the jaw member and a pin projecting from the follower into the groove for positioning the follower, the follower comprising a round piece having the pin disposed between the center and edge thereof, and the inner ends of the sliding jaw members forming equal acute angles with the line of symmetry between the jaw members, the clamp being adapted to produce a positive clamping action whatever the disposition of the sliding jaws.

JAMES G. THOMAS.

References Cited in the file of this patent

UNITED STATES PATENTS

| Number | Name | Date |
|---|---|---|
| 1,642,549 | Jarecki | Sept. 13, 1927 |
| 1,779,053 | Stoner | Oct. 21, 1930 |
| 2,165,322 | Weston | July 11, 1939 |
| 2,384,148 | Yeager | Sept. 4, 1945 |
| 2,417,144 | Trimble | Mar. 11, 1947 |
| 2,498,725 | Thornburg | Feb. 28, 1950 |